United States Patent
Farb et al.

(10) Patent No.: US 11,885,313 B2
(45) Date of Patent: Jan. 30, 2024

(54) SHAFTLESS GENERATOR FOR A FLUID TURBINE

(71) Applicant: Flower Turbines, Inc., Lawrence, NY (US)

(72) Inventors: Mark Daniel Farb, Lawrence, NY (US); John Scott, Olathe, KS (US)

(73) Assignee: FLOWER TURBINES, INC.

( * ) Notice: Subject to any disclaimer, the term of this patent is extended or adjusted under 35 U.S.C. 154(b) by 0 days.

(21) Appl. No.: 18/195,592

(22) Filed: May 10, 2023

(65) Prior Publication Data

US 2023/0279840 A1    Sep. 7, 2023

Related U.S. Application Data

(63) Continuation of application No. PCT/US2022/082035, filed on Dec. 20, 2022.
(Continued)

(51) Int. Cl.

| F03D 9/25 | (2016.01) |
|---|---|
| F03D 80/70 | (2016.01) |
| F03D 3/00 | (2006.01) |
| H02K 7/18 | (2006.01) |
| F03D 80/80 | (2016.01) |

(52) U.S. Cl.
CPC .............. *F03D 9/25* (2016.05); *F03D 3/005* (2013.01); *F03D 80/70* (2016.05); *F03D 80/82* (2016.05); *H02K 7/183* (2013.01); *F05B 2220/706* (2013.01)

(58) Field of Classification Search
CPC . F03D 3/005; F03D 9/25; F03D 80/70; F03D 80/82; F05B 2240/211–218; H02K 5/16; H02K 7/08; H02K 7/102; H02K 7/183
See application file for complete search history.

(56) References Cited

U.S. PATENT DOCUMENTS

| 6,784,566 B2 | 8/2004 | Thomas |
|---|---|---|
| 7,902,688 B2 | 3/2011 | Krivcov |

(Continued)

FOREIGN PATENT DOCUMENTS

| CN | 103683622 A2 | 3/2014 |
|---|---|---|
| GB | 2440264 A | 1/2008 |
| JP | 2007107496 A * | 4/2007 |

OTHER PUBLICATIONS

International Search Report and Written Opinion for International Application No. PCT/US2022/082035 dated Mar. 28, 2023 (8 pages).

(Continued)

*Primary Examiner* — Christopher R Legendre
(74) *Attorney, Agent, or Firm* — Finnegan, Henderson, Farabow, Garret & Dunner LLP

(57) ABSTRACT

A turbine with an associated shaftless electric generator includes a rotor and a stator; a mounting plate rotatable with the rotor and a void along a central axis of the rotor. A plurality of blades extend from the mounting plate. Adjustable bearings are interposed between the rotor and the stator, the adjustable bearings being configured to support the mounting plate and the plurality of blades. A threaded adjustor rod located in the void may be manipulated to adjust tension on the adjustable bearings.

22 Claims, 8 Drawing Sheets

Related U.S. Application Data

(60) Provisional application No. 63/291,465, filed on Dec. 20, 2021.

(56) References Cited

U.S. PATENT DOCUMENTS

| | | |
|---|---|---|
| 7,944,067 B2 | 5/2011 | Kammer |
| 7,988,413 B2 | 6/2011 | Haar |
| 8,207,623 B2 | 6/2012 | Rivas |
| 8,333,564 B2 | 12/2012 | Krivcov |
| 8,364,323 B2 | 1/2013 | Arinaga |
| 8,491,262 B2 | 7/2013 | McGrath |
| 8,648,483 B2 | 2/2014 | Haar |
| 9,689,372 B2 | 6/2017 | Gonzalez |
| 9,835,138 B2 | 12/2017 | Westergaard |
| 2002/0105190 A1 | 8/2002 | Thomas |
| 2002/0125880 A1 | 9/2002 | Murai |
| 2005/0034937 A1 | 2/2005 | Agardy |
| 2005/0143221 A1 | 6/2005 | Kuwahara |
| 2006/0131889 A1 | 6/2006 | Corten |
| 2009/0220342 A1 | 9/2009 | Wu et al. |
| 2009/0243295 A1 | 10/2009 | Kammer |
| 2009/0278352 A1 | 11/2009 | Rivas |
| 2010/0140939 A1 | 6/2010 | Scholte-Wassink |
| 2011/0037269 A1 | 2/2011 | Poon et al. |
| 2011/0111700 A1 | 5/2011 | Hacket |
| 2011/0164977 A1 | 7/2011 | Vallejo |
| 2011/0215640 A1 | 9/2011 | Donnelly |
| 2011/0302864 A1 | 12/2011 | Ramsay |
| 2011/0304150 A1 | 12/2011 | Hara |
| 2012/0056424 A1 | 3/2012 | Holstein |
| 2012/0169052 A1 | 7/2012 | Leipold-Buettner |
| 2012/0175879 A1 | 7/2012 | Keech |
| 2013/0008242 A1 | 1/2013 | Sakaguchi |
| 2013/0197704 A1 | 8/2013 | Pan |
| 2014/0010656 A1 | 1/2014 | Nies |
| 2014/0150843 A1 | 6/2014 | Pearce |
| 2015/0076828 A1 | 3/2015 | Palethorpe |
| 2015/0123401 A1 | 5/2015 | Vigars |
| 2015/0377213 A1 | 12/2015 | Deshpande |
| 2016/0222946 A1 | 8/2016 | Krings |
| 2017/0054301 A1 | 2/2017 | Fintzos |
| 2017/0058899 A1 | 3/2017 | Ichihara |
| 2017/0074249 A1 | 3/2017 | Smook |
| 2017/0114778 A1 | 4/2017 | Madson |
| 2018/0301906 A1 | 10/2018 | Qureshi |
| 2019/0052206 A1 | 2/2019 | Noderer |
| 2019/0186145 A1 | 6/2019 | Farb |
| 2020/0280281 A1 | 9/2020 | Vaidyanathan |
| 2021/0033062 A1 | 2/2021 | Mishra |
| 2021/0098994 A1 | 4/2021 | White |
| 2021/0164442 A1 | 6/2021 | Bonfiglio |
| 2022/0077686 A1 | 3/2022 | Ma |
| 2023/0184218 A1 | 6/2023 | Lund |

OTHER PUBLICATIONS

"Outer Rotor Permanent Magnet Direct Drive Wind Turbin" dated XX, https://www.pengky.cn/zz-direct-drive-turbine/ external-rotor-generator/external-rotor-generator.html (Last accessed May 4, 2023).

PCT International Search Report and Written Opinion dated Jul. 28, 2023, issued in corresponding International Application No. PCT/US23/62170 (6 pgs.).

Blum, Franz, et al. "Device for providing a platform on the roof of a building", May 14, 2020, EPO, DE 102018128308-A1 (Year: 2020).

Arias, Vega Fernando etal., "Mounting for Instruments on Buildings and Method for Installing Same", Oct. 15, 2012, ES-2388388-A1 (Year: 2012).

Guetty, Richard Jean Claude, "Covering Element for Houses, Motor-Vehicles or the Like", Mar. 30, 2015, Romanian Patent Office , RO 130984A2 (Year: 2016).

Non-Final Office Action U.S. Appl. No. 18/113,388 dated Jun. 9, 2023, in the United States Patent and Trademark Office.

Non-Final Office Action U.S. Appl. No. 18/113,366 dated Jun. 29, 2023, in the United States Patent and Trademark Office.

Non-Final Office Action U.S. Appl. No. 118/113,381 dated Jul. 14, 2023, in the United States Patent and Trademark Office.

Notice of Allowance U.S. Appl. No. 18/195,455 dated Jul. 20, 2023, in the United States Patent and Trademark Office.

Non-Final Office Action U.S. Appl. No. 18/195,412 dated Aug. 16, 2023, in the United States Patent and Trademark Office.

Non-Final Office Action U.S. Appl. No. 18/195,437 dated Jul. 11, 2023, in the United States Patent and Trademark Office.

Non-Final Office Action U.S. Appl. No. 18/298,584 dated Jul. 20, 2023, in the United States Patent and Trademark Office.

* cited by examiner

SHAFTLESS GENERATOR FOR A FLUID TURBINE

CROSS REFERENCES TO RELATED APPLICATIONS

This application is a continuation of International Application No. PCT/US2022/082035, filed Dec. 20, 2022, which claims the benefit of priority of U.S. Provisional Patent Application No. 63/291,465 filed on Dec. 20, 2021, and entitled "Shaftless Generator with Pre-Load Screw", the entire contents of all of which are incorporated herein by reference.

BACKGROUND

Electric generators driven by wind turbines may include a central shaft for supporting the load of the blades. Typically, the load of the blades may be transmitted to the shaft of the turbine and from there, to the shaft of the generator. In the case of a wind turbine, the central shaft may bear the weight and wind force of the rotor, and may be required to be sufficiently strong to withstand the strong moments generated by the blades. However, such a shaft may introduce significant inertia to the electric generator, preventing such generators from producing power under low wind speeds. To allow harnessing of power from low wind speeds, an electric generator that may avoid using a bulky central shaft may be advantageous.

DETAILED DESCRIPTION

Figure 1B:
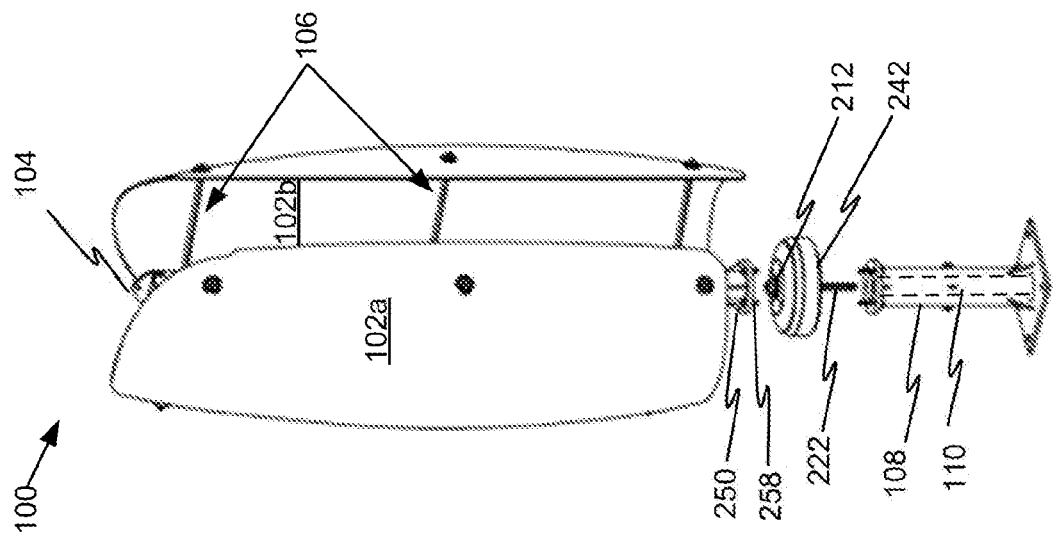
FIG. 1B is an exploded perspective view of the turbine of FIG. 1, consistent with some disclosed embodiments.

Various terms used in this detailed description and in the claims may be defined or summarized differently when discussed in connection with differing disclosed embodiments. It is to be understood that the definitions, summaries and explanations of terminology in each instance apply to all instances, even when not repeated, unless the transitive definition, explanation or summary would result in inoperability of an embodiment.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Embodiments are disclosed for a turbine for obtaining energy from a fluid flow. The turbine may include a shaftless electric generator having a rotor and a stator. The turbine may have a mounting plate being rotatable with the rotor and a void along a central axis of the rotor. A plurality of blades may extend from the mounting plate, and adjustable bearings may be interposed between the rotor and the stator. The adjustable bearings may be configured to support the mounting plate and the plurality of blades. A threaded adjustor rod may be located in the void. The threaded adjustor rod may be configured for manipulation to adjust tension on the adjustable bearings, and may be configured to rotate with the rotor.

Some embodiments involve a turbine for obtaining energy from a flow. A turbine may include a mechanical device configured to capture energy from a fluid flow (e.g., a flow of water, steam, gas, or wind) and convert the captured energy to a form of work (e.g., a rotary motion). A turbine may be combined with a generator to apply the work produced by the turbine to generate electrical power (e.g., for feeding to an electrical power grid). A turbine may include at least one moving part (e.g., a rotor) coupled to a plurality of blades.

Energy may refer to a quantitative property that may be transferred to a physical body or system in association with a performance of work, and/or as heat or light. Energy may have different forms (e.g., chemical, electrical, radiant, mechanical, thermal and nuclear energy) where one form of energy may be convertible to another form of energy. For example, a turbine coupled to a generator may convert mechanical energy (e.g., in a fluid flow) to electrical energy, and a motor may convert electrical energy to mechanical energy (e.g., to power a car or household appliance). Potential energy may refer to energy stored to perform work in the future, and kinetic energy may refer to energy inherent to an object in motion. For example, a battery may store electrical energy as potential energy for subsequent use by a motor. When the motor uses the stored electrical energy to perform rotational work, the potential energy may be converted to kinetic energy.

Flow (e.g., fluid flow) may refer to movement or continual deformation of a fluid under an applied force. Flow may correspond to kinetic energy of particles or molecules of a fluid. For example, a temperature gradient in a fluid may cause warmer fluid to rise and cooler fluid to sink in a cyclical flow motion. Uneven heating of the Earth by the sun (e.g., combined with the Earth's rotation) may cause wind (e.g., airflow). Similarly, wind, water density differentials, gravity, and the Earth's rotation may cause ocean currents (e.g., water flow). Examples of turbines for obtaining energy from a flow may include a windmill, a waterwheel, a steam turbine, or a gas turbine.

Figure 1A:
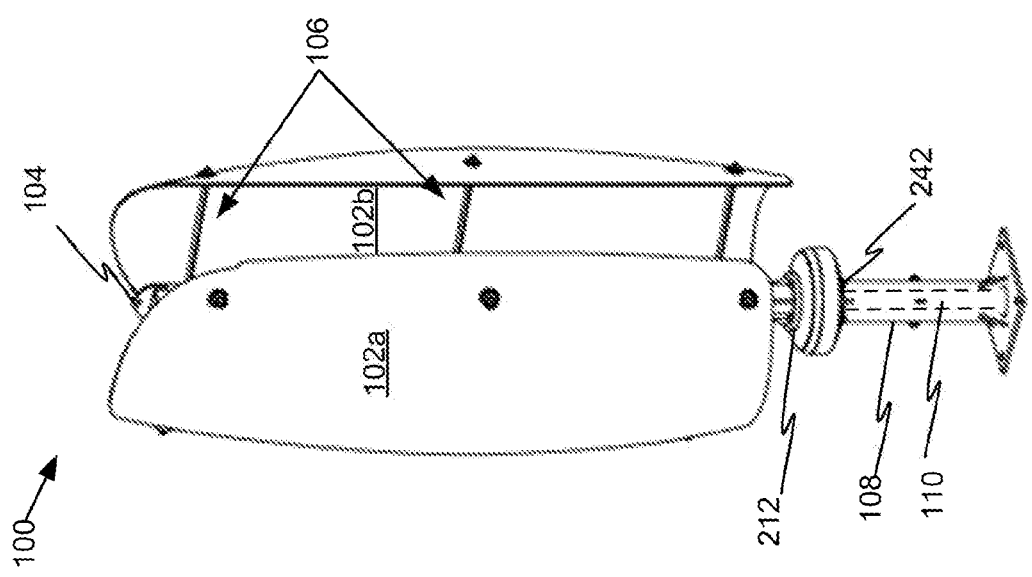
FIG. 1A is a perspective view of an exemplary wind turbine, consistent with some disclosed embodiments.

By way of a non-limiting example, reference is made to FIGS. 1A-1B illustrating an exemplary turbine 100 for obtaining energy from a flow in a perspective view and an exploded view, respectively, consistent with some disclosed embodiments. Turbine 100 may include a plurality of blades 102a and 102b configured to capture energy from a fluid flow (e.g., wind, water, steam, or gas), and convert the captured energy to a rotary motion, causing blades 102a and 102b to spin. Turbine 100 may be connected to an electric generator, described in greater detail hereinbelow, for converting the rotary motion of blades 102a and 102b to electric energy as an alternating current (e.g., AC power).

Some embodiments involve a shaftless electric generator having a rotor and a stator. A rotor may refer to a rotating component of an electromagnetic system (e.g., an electric motor, electric generator, or an alternator). A rotor may rotate, turn, or spin to induce a torque around an axis of the rotor. A stator may refer to a stationary (e.g., non-moving) component of a rotary electromagnetic system. A rotor electromagnetically coupled to a stator may allow for interactions between an electromagnetic coil of an electric conducting wire (e.g., windings) and an alternating magnetic field. The interactions may allow conversion of electrical energy to mechanical energy as rotational motion (e.g., as in a motor) and to convert mechanical energy as rotational motion to electrical energy (e.g., as in an electric generator). For example, energy may flow from a rotating component to a stator, as in a generator where a stator may convert a rotating magnetic field to an alternating electric current.

An electric generator having a rotor and a stator (e.g., an alternator) may refer to a device including windings electromagnetically coupled to an alternating magnetic field via a rotor and stator allowing for conversion of energy in a non-electrical form (e.g., chemical, radiant, mechanical, thermal or nuclear energy) to electrical energy. For example, mechanical energy as rotational motion may be transferred from a turbine to a rotor of an electric generator. The rotational motion of the rotor may cause an alternating magnetic field to surround the windings, which may induce an alternating current, thereby converting mechanical energy to electrical energy. In some embodiments, the rotor may include a magnet or magnets, and the stator may include windings. In some embodiments, the rotor may include windings and the stator may include a magnet or magnets. In some embodiments, the rotor may be configured to rotate within the stator. For instance, the stator may be formed as a ring or donut surrounding the rotor. In some embodiments, the rotor is configured to rotate about the stator. For instance, the rotor may be formed as a ring or donut surrounding the stator.

In some embodiments, the rotor is connected to blades that are configured to rotate in response to a wind flow. A wind flow may refer to a fluid flow consisting of air. In some embodiments, the rotor may be configured to rotate in response to water flow on an impeller (e.g., paddle wheel, a water wheel), or in response to steam or gas flow.

A shaft may include a pole, a rod, a post, a support, a pylon, or any other axle or axis. In some embodiments, a shaft may be used to support one or more objects in a vertical configuration. For example, blades of a vertical turbine may be connected to a shaft allowing the blades to be supported vertically by the shaft which may rotate with the blades. Connecting the shaft with the blades to a rotor may allow transferring kinetic energy of a flowing fluid to a rotary motion by the rotor to produce electrical energy. A shaftless turbine may refer to a system or apparatus with blades but lacking (e.g., absent, excluding, or devoid of) a shaft for supporting the blades. For instance, a shaftless turbine may support one or more blades of a vertical turbine vertically in absence of (e.g., without using) a shaft in the center thereof. In contrast, a shaftless electric generator may refer to an electric generator having a rotor and a stator for converting non-electrical energy to electrical energy absent a shaft within the generator itself for supporting the rotor. For example, blades of a vertical turbine may be mechanically coupled (e.g., directly, or indirectly) to a rotor without using a shaft within the generator itself for supporting the rotor.

Figure 2A:
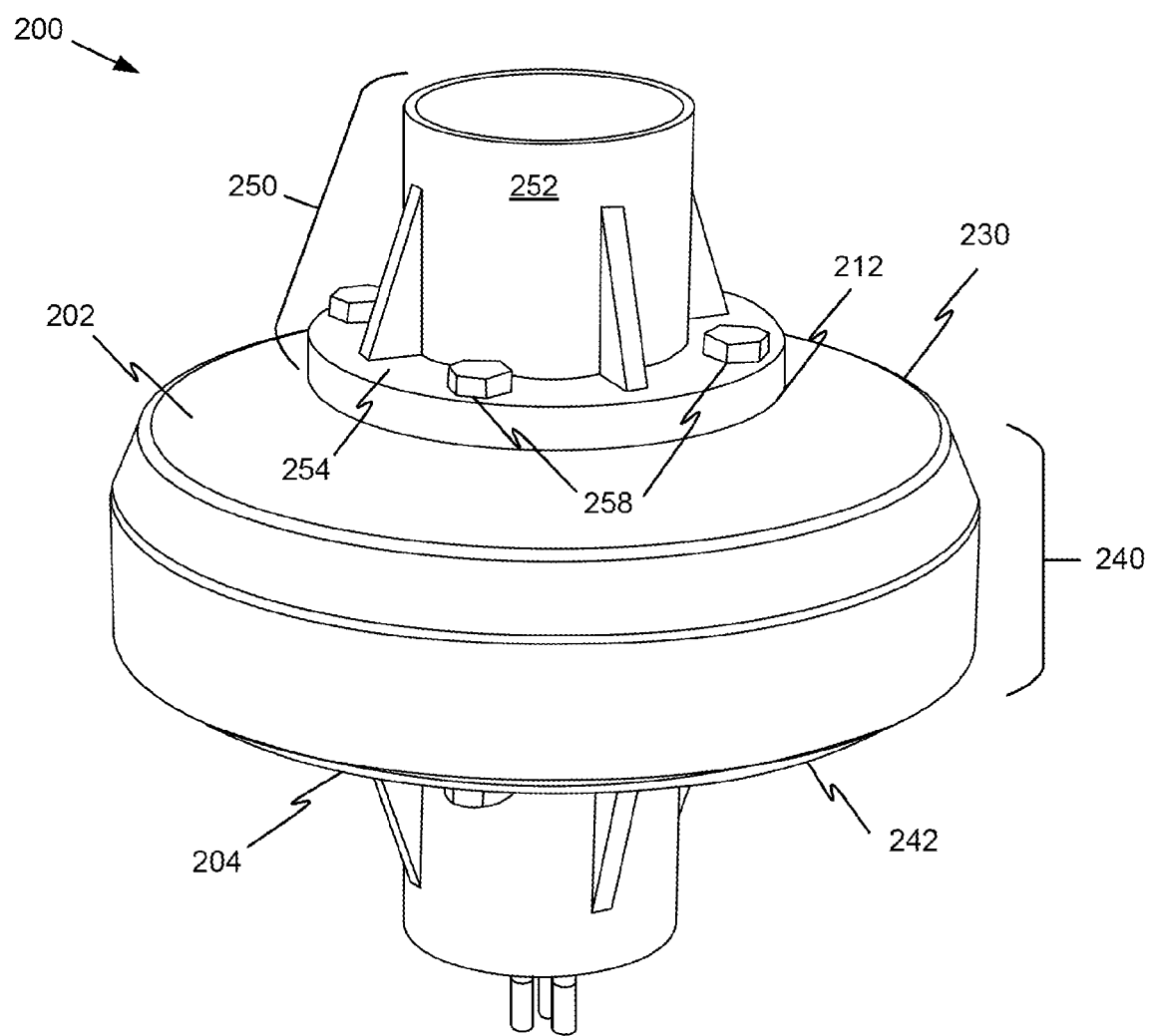
FIG. 2A is a perspective view of the shaftless electric generator consistent with some disclosed embodiments, consistent with some disclosed embodiments.
Figure 2B:
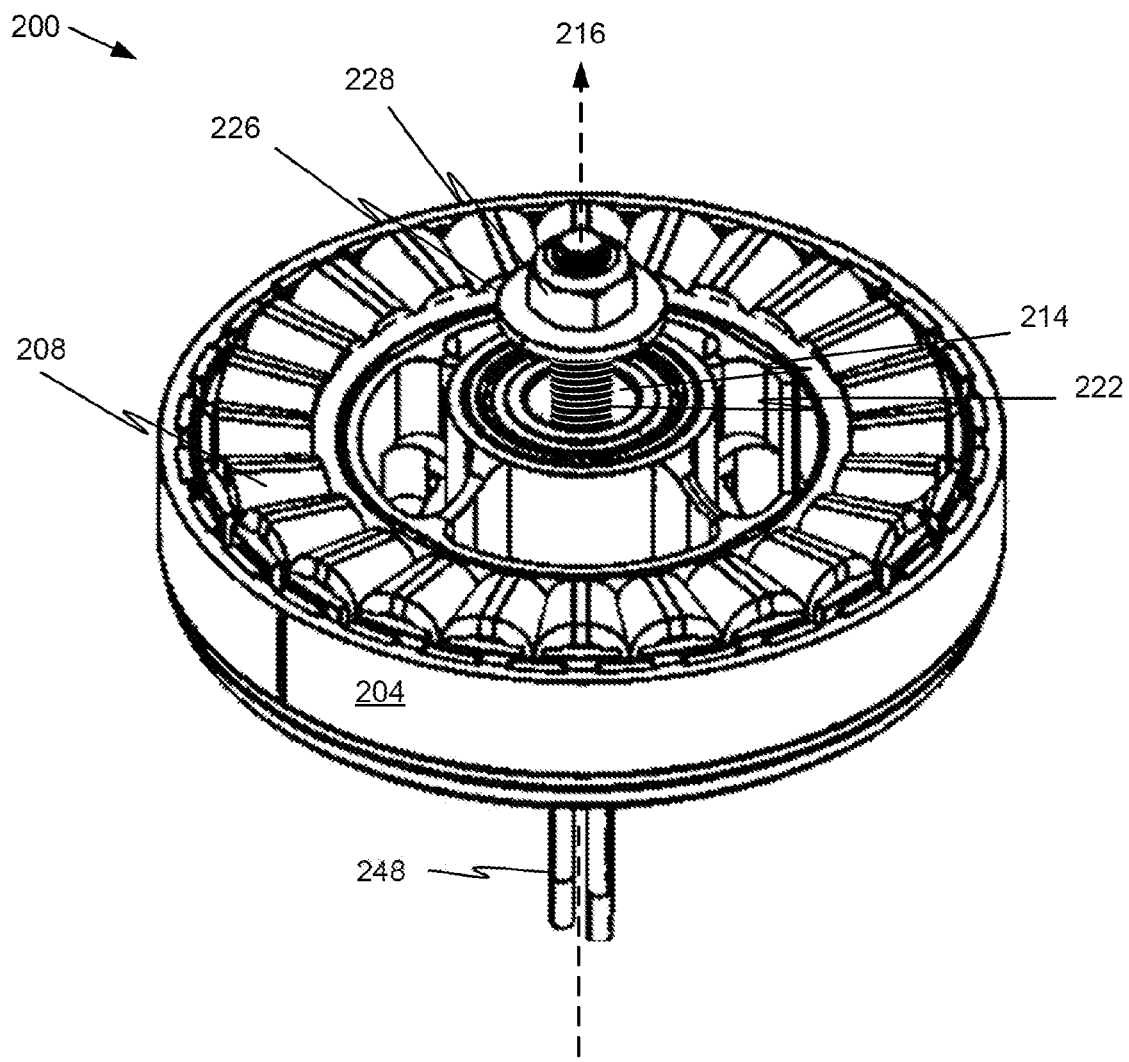
FIG. 2B illustrates the electric generator of FIG. 2A with the upper housing removed, consistent with some disclosed embodiments.
Figure 2C:
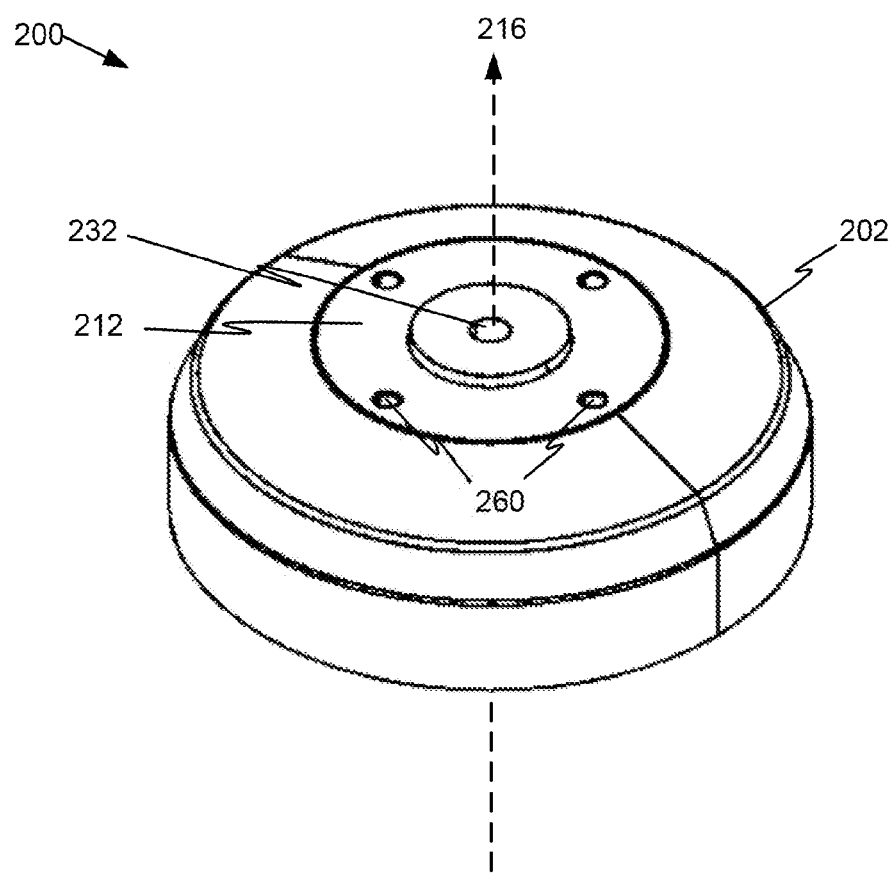
FIG. 2C is a perspective view of the upper housing and mounting plate of the shaftless electric generator of FIG. 2A consistent with some disclosed embodiments.
Figure 2D:
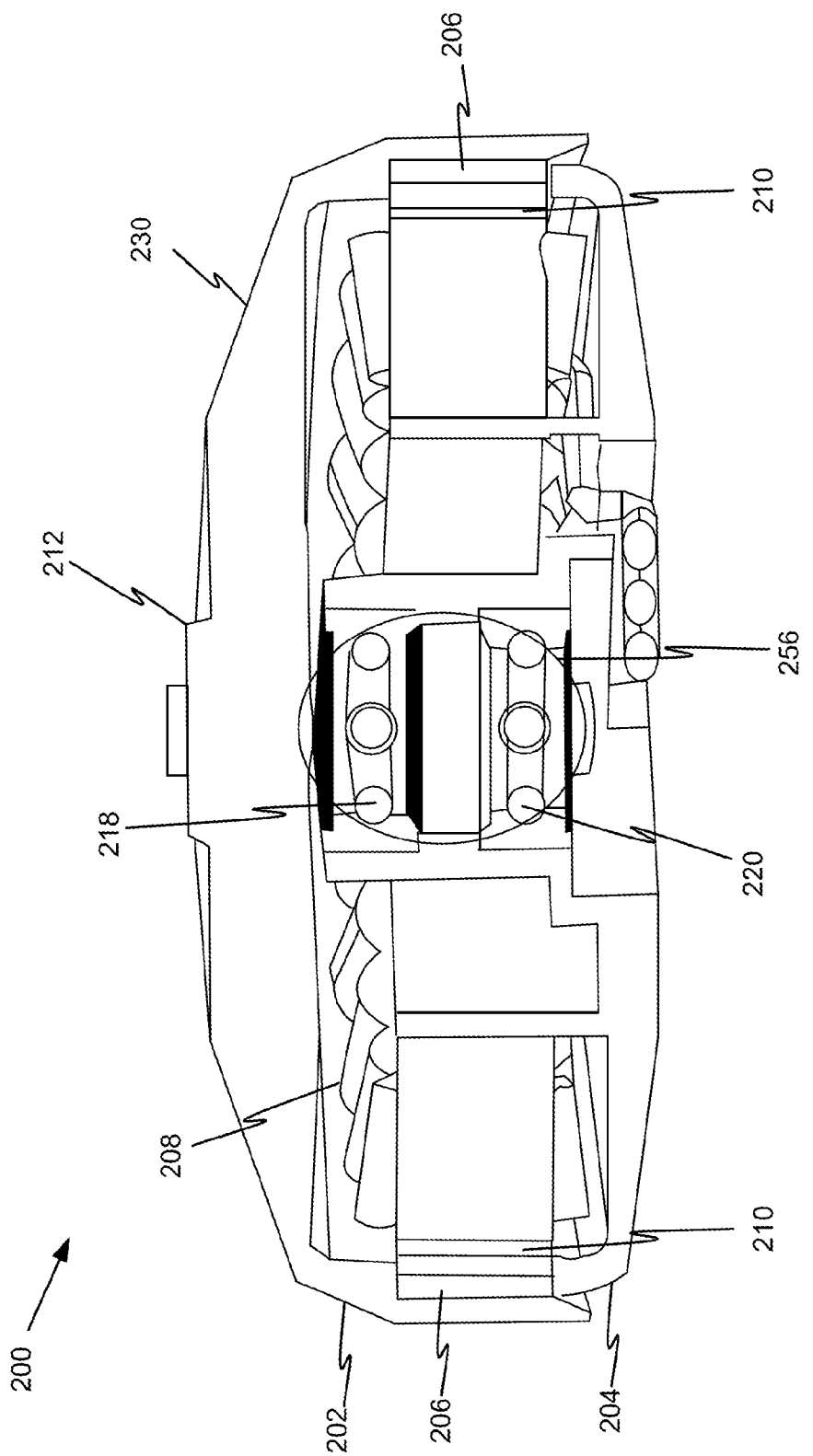
FIG. 2D is a cross-sectional side view of the shaftless electric generator of FIG. 2A, consistent with some disclosed embodiments.
Figure 2E:
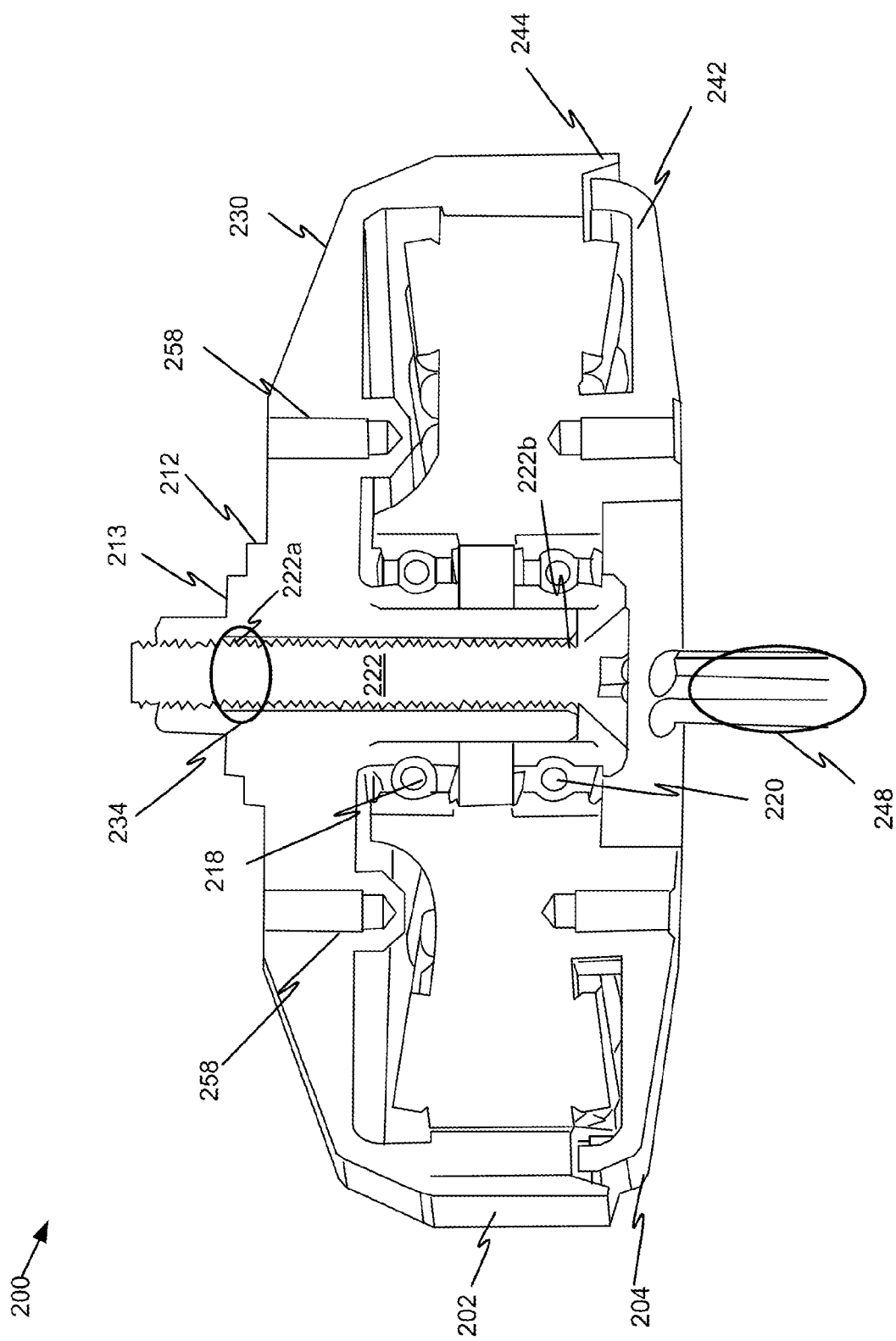
FIG. 2E is a cross-sectional side view of another embodiment of the shaftless electric generator with a threaded mounting plate, consistent with some disclosed embodiments.
Figure 3:
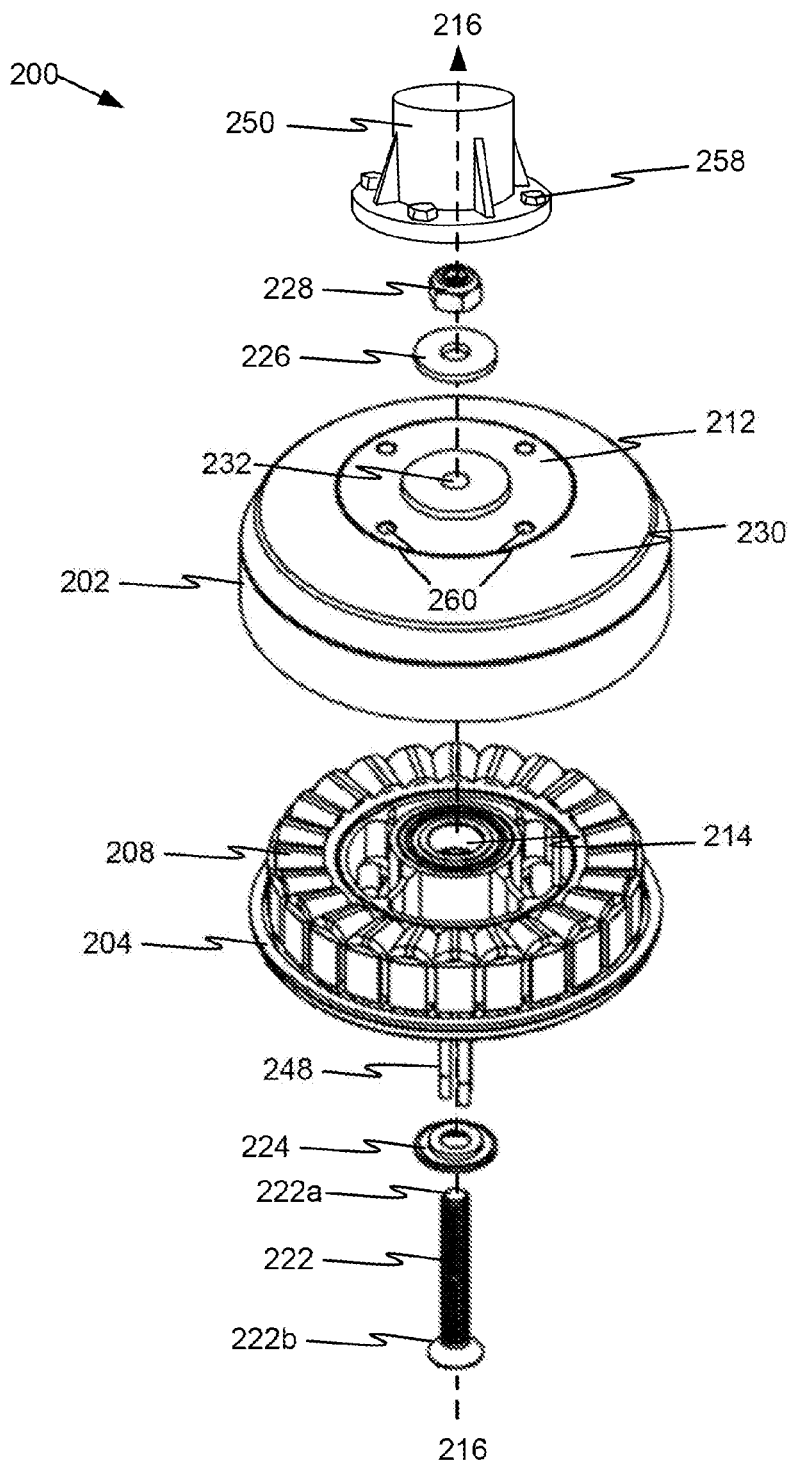
FIG. 3 illustrates an exploded view of shaftless electric generator, consistent with some disclosed embodiments.

By way of a non-limiting example, reference is made to FIGS. 2A-2E illustrating multiple views of an exemplary shaftless electric generator 200, consistent with some disclosed embodiments. FIG. 2A-2C illustrate various perspective view of shaftless electric generator 200. FIG. 3 illustrates an exploded view of shaftless electric generator 200. FIGS. 2D-2E illustrate different cross-sectional views of shaftless electric generator 200. Shaftless electric generator 200 may include a rotor 202 and a stator 204. Rotor 202 may be mechanically coupled to blades 102a and 102b and may be free to rotate, allowing for transfer of rotational motion of blades 102a and 102b to rotor 202 such that rotor 202 and blades 102a and 102b may spin in unison. Stator 204 may be constrained from rotating, and may remain stationary relative to rotor 202 while rotor 202 spins.

Reference is now made to FIG. 2D illustrating a cross-sectional view of exemplary shaftless electric generator 200, consistent with some disclosed embodiments. In the embodiment shown, rotor 202 includes one or more magnets 206 and stator 204 includes windings 208 (e.g., copper windings). However, it is to be noted that some implementations may allow rotor 202 to include windings and stator 204 to include one or more magnets. Rotor 202 may be separated from stator 204 by a gap 210, allowing rotor 202 to rotate freely relative to stator 204. For instance, gap 210 may include air. The rotation of rotor 202 (e.g., in unison with blades 102a and 102b connected thereto) relative to stator 204 may cause an alternating magnetic field to surround windings 208, generating an alternating current, thereby converting the rotational motion (e.g., mechanical energy) of blades 102a and 102b to electrical energy. In the embodiments illustrated in FIGS. 2A-2C, rotor 202 may form a concentric ring about stator 204, and may rotate about stator 204. However, in other embodiments, a stator may form a concentric ring about a rotor, allowing the rotor to rotate within the stator.

Some embodiments involve a mounting plate being rotatable with the rotor. A mounting plate may refer to a disc, ring, or saucer shaped object functioning as a foundation, platform, or base for supporting one or more other objects. While an overall shape of the mounting plate may be disc-shaped, the mounting plate may include a non-disk shaped component mounted on a disc. The mounting plate may be configured to rotate (e.g., turn, spin, revolve, pivot) may include motion about an axis or center, where a rate of rotation may be measured as angular velocity. A torque (e.g., rotational force) applied to an object may cause the object to turn (e.g., rotate) about an axis or center to acquire angular acceleration. Thus, for example, when blades are connected to a mounting plate, forces on the blades may translate to the mounting plate, rendering the mounting plate rotatable. The mounting plate may include a cover or housing (e.g., of an electric generator) connected to a rotor such that the rotor may turn with the mounting plate, rendering the mounting plate rotatable with the rotor. For example, connecting a plurality of blades (e.g., directly, or indirectly) to a mounting plate may allow transferring a rotational force of the blades to the rotor via the mounting plate, allowing for conversion of kinetic energy of a flowing fluid to electrical energy in the absence of a generator shaft, eliminating a need for a central shaft positioned at a central axis of the rotor.

By way of a non-limiting example, FIG. 2C illustrates a mounting plate 212 connected to rotor 202 of shaftless electric generator 200 and configured to rotate with rotor 202. Mounting plate 212 may include holes 260 for receiving bolts to connect blades 102a and 102b to rotor 202 (e.g., see bolts 258 in FIG. 2A connecting blades 102a and 102b to rotor 202 via a flanged spindle 250 as described in greater detail hereinbelow).

Some embodiments involve a void along a central axis of the rotor. A void may include a hollow, a space, and/or a gap. In some disclosed embodiments, a void is a threaded hole, such as a bolt-hole, a screw-hole, a tapped hole, a fixing hole, or any other threaded member or member that may be adjusted through rotation. Thus, a void may be configured to receive a screw, bolt, or other threaded member therein. The void may include a central axis, about which a threaded member may be rotated. As a rotor rotates, a void along a central axis of the rotor may remain in the same relative axial position at the center of the electric generator.

By way of a non-limiting example, FIG. 2B illustrates a void 214 along a central axis 216 of rotor 202. Void 214 may correspond to a space where a shaft would typically be included in a generator having a shaft.

Some embodiments involve a plurality of blades extending from the mounting plate. A blade (e.g., blades) of a turbine may refer to an object having a cross-sectional shape with a curved surface (e.g., an airfoil shape or a cupped shape typical of drag-type turbines) configured to cause a motion (e.g., a rotational motion) consistent with the fluid motion incident on the blades. A turbine may include a plurality of blades mounted onto a rim of a disc for producing a tangential force to rotate a rotor connected thereto. Moving fluid may act on the blades of a turbine causing the blades to rotate and impart rotational energy to a rotor. The blades may extend from the rotor in that they protrude from the rotor itself or a mounting plate mechanically connected to the rotor. For example, connecting a plurality of blades to a mounting plate (e.g., directly or indirectly) may cause the plurality of blades to extend outwards and/or upwards from the mounting plate. Thus, a plurality of blades extending from a mounting plate may include more than one blade directly or indirectly attached to the mounting plate, e.g., instead of connecting the plurality of blades to a shaft connected them to the rotor via the mounting plate. The blades may be bolted directly onto a mounting plate, or to a plate or spindle connected to the mounting plate. Connecting a plurality of blades directly or indirectly to a mounting plate may allow for transfer of rotational forces (e.g., torque) to a mounting plate integrated with a housing of a shaftless generator (e.g., allowing for operation of an electric generator without use of, or devoid of a shaft). In some embodiments, the plurality of blades may be vertically upstanding elongated blades. In some embodiments, the plurality of blades may extend horizontally from or at an angle relative to the mounting plate. In some embodiments, the plurality of blades may be disposed along a vertical axis coincident with a rotational axis of the generator. For example, such a configuration may allow distributing a load (e.g., forces, torque) of the plurality of blades on to the rotor and/or onto a mounting plate connected to the rotor.

By way of a non-limiting example, FIG. 1A illustrates plurality of blades 102a and 102b extending from mounting plate 212, e.g., using one or more bolts and/or screws that secure (see, e.g., bolts 258 in FIG. 2A). Blades 102a and 102b may extend upwards from mounting plate 212 in a vertical orientation (e.g., in a tulip-like configuration). Blades 102a and 102b may have cross-sectional shape having a curved or cupped surface and may be configured to spin in response to a fluid flow (e.g., air or water) incident thereon.

Some embodiments involve adjustable bearings interposed between the rotor and the stator. Bearings may include rolling elements, such as rollers or balls having a circular cross-section and permitting rotation of the bearings about a central axis. Positioning bearings between two parts of a system may allow the two parts to move with respect to each other while reducing friction therebetween. For example, bearings may allow rotational motion of an object (e.g., a rotor) relative to a stationary object (e.g., a stator). Adjustable may refer to adaptable, variable, or capable of being modified, e.g., to accommodate different circumstances, conditions, constraints, and/or a desired outcome. For instance, a screw connected to two different objects may be adjusted in a tightening direction (e.g., turned clockwise) to pull the objects closer together, and may be adjusted in a loosening direction (e.g., turned counter-clockwise) to push the objects further apart, depending on circumstances, conditions, constraints, and/or the desired outcome. Adjustable bearings may refer to an arrangement of bearings permitting modification of distances (e.g., clearances) between individual bearings and/or between the bearings another object (e.g., a mounting plate and/or an upper housing of an electric generator). For instance, increasing bearing clearances may allow the bearings to rotate more freely, allowing an object in contact with the bearings to move more freely as well. Similarly, decreasing bearing clearances may inhibit rotation of the bearings, inhibiting movement of an object in contact with the bearings. Interposed may refer to placing, inserting, or positioning one or more objects between other objects, e.g., to sandwich the one or more object between the other objects. For example, interposing bearings between a rotor and a stator may cause the bearings to be wedged or inserted between the rotor and the stator, allowing the rotor to rotate freely (e.g., with reduced friction) relative to the stator.

Some embodiments involve the adjustable bearings being configured to support the mounting plate and the plurality of blades. Support may include carrying, holding, or propping up. A platform or base may support one or more objects to hold the one or more objects in a particular position, for example, in an elevated or upright position. Adjustable bearings supporting a mounting plate and a plurality of blades may involve positioning adjustable bearings beneath the mounting plate such that the mounting plate may rest on the adjustable bearings and the plurality of blades connected to the mounting plate may be held or propped up in a vertical orientation relative to the mounting plate.

By way of a non-limiting example, FIG. 2D shows adjustable bearings 218 and 220 interposed between rotor 202 and stator 204. Adjustable bearings 218 and 220 may support mounting plate 212 and blades 102a and 102b, connected thereto. Adjustable bearings 218 and 220 may reduce friction between rotor 202 rotating in unison with blades 102a and 102b due to a fluid flow and stator 204. In some embodiments, adjustable bearings 218 and 220 may bear a radial load and an axial load imposed on shaftless electric generator 200 by blades 102a and 102b.

In some embodiments, the adjustable bearings serve as a sole location of contact between the plurality of blades and the stator. Sole may refer to exclusive, only, or singular. A location of contact (e.g., a point of contact) may refer to a point, area, or region where two or more components may meet, touch, connect, couple, interface, and/or communicate. A location of contact in a mechanical system may include a point, region, or area of friction between two mechanical components moving relative to one another. A location of contact may be direct or indirect. Direct contact between two components may involve two components physically touching one another. Indirect contact between two components may involve interposing one or more elements between the two components such that the two components are mechanically coupled via the one or more elements. For example, friction may be introduced via one or more of the interposed elements. The rotor (e.g., mechanically coupled to the plurality of blades via the mounting plate) may be free to spin relative to the stator. In other words, the rotor may be radially decoupled from the stator to allow the rotor to spin while the stator remains stationary. In some embodiments, the spinning motion of the rotor relative to the stator may be enabled solely by the adjustable bearings (e.g., by reducing friction therebetween), and which may be the exclusive location of contact (e.g., direct and/or indirect) between the rotating components and the stationary components of the shaftless electric generator and turbine. The rotating components may include the plurality of blades coupled to the rotor via the mounting plate such that the adjustable bearings may be the only (e.g., sole) location of contact between the plurality of blades and the stator. This configuration may allow a radial load (e.g., a torque) produced by the plurality of blades while rotating to be transferred to the mounting plate and rotor. In some embodiments, an axial load (or a portion of an axial load) produced by the plurality of blades may be transferred to the mounting plate and rotor.

By way of a non-limiting example, FIG. 2D illustrates adjustable bearings 218 and 220 as a sole location of contact between rotor 202 connected to mounting plate 212 and stator 204. Blades 102a and 102b may connect to mounting plate 212 (FIG. 1A), thus adjustable bearings 218 and 220 may be a sole location of contact between blades 102a and 102b and stator 204.

Some embodiments involve a threaded adjustor rod located in the void (e.g., the threaded adjustor may be positioned in, disposed in, and/or situated in the void. A rod may include a bar (e.g., a thin straight bar), a cylinder, and/or a dowel. A threaded adjustor rod may refer to a cylindrical bar or dowel having a helical or spiral ridge located along at least a portion thereon, such as a screw, bolt, or other threaded member. The helical or spiral ridge may be associated with a corresponding helical or spiral groove of a void or bore configured to receive the threaded rod, such as is illustrated in FIG. 2E. Alternatively, the void may not include threading, and one or more end nuts located on the threaded adjustor rod may enable tightening. A threaded adjustor rod located in the void may refer to positioning a threaded adjustor rod in the void, e.g., using a screwing motion on a screw or by turning one or more nuts on a bolt. The threaded adjustor rod may be located in place of a shaft that may typically bear a radial load of a plurality of blades of a turbine. However, the threaded adjustor rod may be substantially independent or free of the radial load of the plurality of blades of the turbine. An absence of a shaft may free space for a threaded adjustor rod in its place. In some embodiments, the void along the central axis of the rotor may include a helical or spiral groove corresponding to the helical or spiral ridge of the threaded adjustor rod, such that turning or twisting the threaded rod in one direction (e.g., in a clockwise direction when the threaded rod is facing downwards into the void) may push the threaded rod into (or further into) the void and turning or twisting the threaded rod in the opposite direction (e.g., in a counter-clockwise direction when the threaded rod is facing downwards into the void) may remove (or may partially remove) the threaded rod from the void. In some embodiments, the threaded adjustor rod may bear at least a portion of an axial load of the plurality of blades. In some embodiments, the threaded adjustor rod may push against the plurality of bearings from the side of the upper housing (e.g., the rotating portion of the shaftless generator) and may have no direct contract with the structures associated with the lower housing (e.g., the stationary portion of the shaftless generator).

In some embodiments, the threaded adjustor rod is configured for manipulation to adjust tension on the adjustable bearings. Manipulation may include an action for maneuvering, guiding, controlling, tuning, or adjusting, e.g., to tighten and/or loosen. Tension may refer to tightness or pressure, e.g., causing a pulling force. In some embodiments, tension may refer to an ability to release or inhibit rotational motion (e.g., low tension may facilitate rotation and high tension may inhibit rotation). In some embodiments, tension may include a compression and/or a compressive force (e.g., increased tension may correspond to increased compression and decreased tension may correspond to decreased compression). Tension on the adjustable bearings may refer to pressure or tightness on the adjustable bearings, e.g., due to small bearing clearances that may increase friction between individual bearings and/or a bearing ring. Twisting or turning the threaded adjustor rod (and/or turning a nut on the threaded adjustor rod, depending on configuration) in a tightening direction may cause bearing clearances to decrease, thereby increasing the tension on the adjustable bearings. Similarly, twisting or turning in a loosening direction may cause the bearing clearances to increase, thereby decreasing the tension on the adjustable bearings. Adjusting the adjustable bearings too loosely may allow the electric generator to wobble during operation, and adjusting the adjustable bearings too tightly may cause wear on the bearings, shortening their lifespan. Moreover, when the bearings are too tight, lighter fluid flows (e.g., lower wind forces) may not be able to turn the rotor, and therefore the ability of the generator to convert wind energy into electrical energy may be hindered. By enabling the tension on the bearings to be adjusted via a threaded adjustor rod, a balance can be struck between wobble prevention and enablement of electricity generation at low fluid flow forces.

In some embodiments, the threaded adjustor rod may be configured with one or more washers, such that tightening the threaded adjustor rod may compress one or more of the washers (e.g., washers 224 and/or 226 in FIG. 3), for exerting compression force on the housing of the generator which forces are transferred to the adjustable bearings. The assembly of the threaded adjustor rod, the adjustable bearings, and the one or more washers may allow tightening the bearings sufficiently to prevent wobble, while maintaining sufficient clearance to reduce wear on the bearings and to permit energy generation at lower wind or other fluid speeds.

In some embodiments, the threaded adjustor rod may be set (e.g., loaded) in advance. Preloading the threaded adjustor rod may allow matching tolerance variations of an electric generator assembly to an initial torque expectation and performance. The threaded adjustor rod may be preloaded by applying an axial load to adjust internal clearances between the adjustable bearings. Preloading the threaded adjustor rod may affect the tightness of the adjustable bearings located between the rotor and stator, and may determine a starting torque and friction on the adjustable bearings when the turbine begins to spin. In some embodiments, a shaftless generator may begin producing electrical energy at lower turbine speeds (e.g., low fluid speeds), for instance, if the starting torque on the adjustable bearings is maintained below 1.0 Newtons, and the outer housing of the electric generator (e.g., connected to the plurality of blades) is able to spin substantially freely. In some embodiments, the threaded adjustor rod may be configured for locking at a selected tightness (e.g., using a nut interposed with a washer. The threaded adjustor rod may facilitate adjustment of the pressure on the adjustable bearings while simultaneously reinforcing the electric generator along the central axis. This may accommodate stack-up tolerances.

In some embodiments, adjusting the bearings may reduce tolerances between bearing components (e.g., to reduce wiggle room for each bearing). The threaded adjustor rod may allow maintaining tolerances between the adjustable bearings to comply with recommended specifications, such that they may not be overly torqued (e.g., overly compressed). Maintaining the correct bearing clearances (e.g., play between the bearings) may allow for more even wear on the bearings and may increase service time thereof.

In some embodiments, a bearing preload process may include adding a sustained axial load, independent of external loads, to one or more bearings. An axial preload may ensure constant contact between the ball complement and bearing races to reduce and/or eliminating both modes of play (e.g., axial and radial).

In some embodiments, bearings usage may determine an amount of load added during a preload process. For example, the adjustable bearings may be preloaded until there is substantially no axial freedom among the bearings, while allowing the bearings to rotate freely (e.g., with the rotor). In some implementations, the adjustable bearings may be preloaded manually via the threaded adjustor rod (e.g., according to a manufacturing specification for the adjustable bearings.

In some embodiments, the threaded adjustor rod is configured to rotate with the rotor. For instance, the threaded adjustor rod may be mechanically coupled to a housing of the electric generator and the housing may be coupled to the rotor such that when the rotor rotates (e.g., due to rotation of the blades coupled to the housing via the mounting plate), the threaded adjustor rod may rotate as well. However, it is to be noted that the threaded adjustor rod may be decoupled from a load of the plurality of blades. Thus, rotation of the threaded adjustor rod with the rotor may avoid introducing torque due to blade load during operation of the electric generator, e.g., specifically when the electric generator begins operation.

By way of a non-limiting example, FIG. 2B illustrates a threaded adjustor rod 222 located in void 214. Referring to FIG. 2E, threaded adjustor rod 222 may be manipulated to adjust tension on adjustable bearings. Threaded adjustor rod 222 may be connected to mounting plate 212 and may be configured to rotate with rotor 202. Adjusting the threaded adjustor rod may occur either through the adjustment of a threaded rod in the void, or by tightening a nut on the threaded rod.

By way of another non-limiting example, FIG. 3 illustrates an exploded view of shaftless electric generator 200, consistent with some disclosed embodiments. Shaftless electric generator 200 may include a bearings washer 224, an upper housing washer 226, a nut 228, and an upper housing 230. Bearings washer 224 may be located beneath adjustable bearings 218 and 220. Upper housing washer 226 may be located above mounting plate 212 and upper housing 320 (e.g., above adjustable bearings 218 and 220). Threaded adjustor rod 222 may be inserted through bearings washer 224, beneath adjustable bearings 218 and 220, along central axis 216 of rotor 202, through upper housing washer 226, and enclosed by nut 228 above upper housing 230. Manipulating threaded adjustor rod 222 in a tightening orientation may shorten a distance along axis 216 between bearings washer 224 and upper housing washer 226, causing clearances of adjustable bearings 218 and 220 (see e.g., FIG. 2E) to decrease, thereby increasing pressure on adjustable bearings 218 and 220 to increase friction between rotor 202 and stator 204. Similarly, manipulating threaded adjustor rod 222 in a loosening orientation may increase a distance along axis 216 between bearings washer 224 and upper housing washer 226, causing clearances of adjustable bearings 218 and 220 to increase, thereby decreasing pressure on adjustable bearings 218 and 220, to reduce friction between rotor 202 and stator 204.

In some embodiments, the adjustable bearings include two rings of bearings, and wherein the threaded adjuster rod is configured to enable adjustment of pressure between the two rings of bearings. A ring of bearings (e.g., slewing ring bearings, or turnable bearings) may include ball or roller bearings arranged in a circular or hoop configuration. A ring of bearings may be configured to support heavy axial, radial, and/or tilting moment load (e.g., torque). In some embodiments, the threaded adjustor rod may be associated with a first ring of bearings and a second ring of bearings such that twisting or turning the threaded adjustor rod in a loosening direction may cause the bearing clearances between the first and second rings of bearings to increase, and twisting or turning the threaded adjustor rod in a tightening direction may cause the bearing clearances between the first and second rings of bearings to decrease. The first and second rings of bearings may be donut-shaped (e.g., a torus) enclosing a central hole and the threaded adjuster rod may pass through the central hole of both the first and second rings of bearings (e.g., the rings of bearings may be stacked on the threaded adjustor rod). A first washer may be disposed at an end of the threaded adjustor rod associated with the first ring of bearings and a second washer may be disposed at an opposite of the threaded adjustor rod associated with the second ring of bearings such that manipulating the threaded adjustor rod in a tightening/loosening direction (e.g., by turning or twisting) causes the first and/or second washer to compress/expand the first and second rings of bearings, thereby reducing clearances therebetween. In some embodiments, each ring of bearings may be encased, enclosed, or shielded, e.g., within a pocket. Some embodiments may include more than two sets of bearings. Each ring of bearings may have the same or a different number of individual bearings. In some embodiments, a single ring of bearings may be associated with the rotor. In some embodiments, two rings of bearings may be associated with the rotor. In some embodiments, three or more rings of bearings may be associated with the rotor.

In some embodiments, the two rings of bearings are located in a common cavity. A cavity may include a chamber, a volume, or space, e.g., for filling with one or more objects. A common cavity may refer to a shared space that may be capable of being filled with multiple objects. The two rings of bearings may be located in the same volume or cavity inside the electric generator and may interface between the (rotor and stator) to reduce friction therebetween. In some embodiments, adjusting tension on the adjustable bearings compresses or expands the adjustable bearings in the common cavity. In some embodiments, the two rings of bearings may facilitate in stabilizing the shaftless electric generator.

By way of a non-limiting example, FIG. 2D illustrates two rings of adjustable bearings 218 and 220. Ring of bearings 218 and 220 may reduce friction between rotor 202 and stator 204, enabling rotor 202 to controllably rotate relative to stator 204 by adjusting a tension of rings of adjustable bearings 218 and 220 (e.g., by manipulating threaded adjustor rod 222, as described earlier). In some implementations, rings of adjustable bearings 218 and 220 may be located in a common cavity 256 inside shaftless electric generator 200.

In some embodiments, the mounting plate includes an opening therein through which the threaded adjustor rod is configured to extend through the opening. An opening may include an orifice, a hole, a gap, or an aperture. A mounting plate including an opening may involve a hole or orifice in the mounting plate (e.g., in a center region of the mounting plate). The opening may allow the threaded adjustor rod to extend (e.g., protrude) from the rotor through the mounting plate. For instance, tightening the threaded adjustor rod may cause the threaded adjustor rod to advance further through the opening of the mounting plate increasing the portion of the adjustor rod extending through the mounting plate, and loosening the adjustor rod may cause the threaded adjustor rod to recede from the opening of the mounting plate decreasing the portion of the adjustor rod extending through the mounting plate.

In some embodiments, a nut is located on a distal end of the threaded adjustor rod to thereby enable tension to be increased on the adjustable bearings when the threaded adjustor rod is tightened in the nut. A nut may include a fastener or lock having a threaded hole (e.g., including a helical or spiral groove corresponding to a helical or spiral ridge of the threaded adjustor), such that turning the nut relative to the threaded adjustor rod may lock/unlock a position thereof. In some embodiments, a distal end of a threaded adjustor rod may be associated with a rotor of an electric generator and a proximal end of the threaded adjustor rod may be associated with the stator. A nut located on a distal end of the threaded adjustor rod may involve positioning the nut above the rotor of the electric generator to allow receiving the distal end of the threaded adjustor rod through the threaded hole of the nut. For example, the nut may be located atop the opening of the mounting plate. Tightening a threaded adjustor rod in a nut may involve turning or screwing the threaded adjustor rod to cause the distal end of the threaded adjustor rod to advance into the nut. In some embodiments, this action may cause the portion of the threaded adjustor rod located along the central axis of the rotor to become shorter, compressing a volume encasing the adjustable bearings. In some embodiments, the compressed volume may decrease the clearances between the individual bearings, causing the tension or (e.g., compression and/or compressive force on) the adjustable bearings to increase.

By way of a non-limiting example, in FIG. 3, mounting plate 212 may include an opening 232 through which threaded adjustor rod 222 may extend. Nut 228 may be located on a distal end 222a of threaded adjustor rod 222 (e.g., when inserted into shaftless generator 200 along axis 216), to thereby enable increasing tension on bearings 218 and 220 (FIG. 2E) when threaded adjustor rod 222 is tightened in nut 228. Tightening threaded adjustor rod 222 in nut 228 may cause threaded adjustor rod 222 to advance further into nut 228, pulling bearings washer 224 closer to upper housing washer 226 (e.g., or pulling upper housing washer 226 closer to bearings washer 224), thereby increasing pressure on adjustable bearings 218 and 220.

In some embodiments, a central bore underlies an upper surface of the mounting plate, the central bore being threaded and configured for receiving the threaded adjustor rod, to thereby enable tension to be increased on the adjustable bearings when the threaded adjustor rod is tightened in the threaded bore. The central bore may be accessed via channel or hole in the mounting plate (e.g., corresponding to a center of the electric generator) allowing the threaded adjustor rod (e.g., a screw, bolt), to advance into the bore by turning the threaded adjustor rod relative to the mounting plate. Turning or screwing the threaded adjustor rod may cause the distal end of the threaded adjustor rod to advance into the threaded bore, causing the portion of the threaded adjustor rod located along the central axis of the rotor to become shorter, compressing a volume encasing the adjustable bearings. The compressed volume may decrease the clearances between the individual bearings, causing the tension of the adjustable bearings to increase. By way of example, FIG. 2E illustrates a threaded bore 234 beneath an upper surface of the mounting plate for receiving a screw as illustrated (or in an alternative embodiment, a bolt.)

In some embodiments, the threaded adjustor rod is adjustable from a side of the adjustable bearings opposite the mounting plate. A side of the adjustable bearings opposite the mounting plate may refer to a side of the electric generator beneath the adjustable bearings (e.g., an underside of the electric generator in a vertically aligned turbine configuration). For instance, the mounting plate may be located above the electric generator, and associated (e.g., connected to) with a cover of the generator. A distal end of the threaded adjustor rod may be associated with the mounting plate above the electric generator, and a proximal end of the threaded adjustor rod may be associated with the adjustable bearings, beneath the electric generator, such that the threaded adjustor rod may be adjusted at the proximal end. As illustrated in FIG. 2E for example, the adjustment rod 222 is a screw that can be tightened from beneath the generator. This can be particularly advantageous in situations where blades mounted on the mounting plate make it more difficult to vary tension on the bearings via the threaded adjustment rod.

By way of a non-limiting example, in FIG. 2E, a threaded bore 234 beneath the upper surface 213 of the mounting plate 212 may have a spiral groove corresponding to a spiral ridge on threaded adjustor rod 222. Turning threaded adjustor rod 222 in a tightening direction may cause a distal end 222a of threaded adjustor rod 222 to advance into threaded bore 234 pulling bearings washer 224 closer to upper housing washer 226 (e.g., or pulling upper housing washer 226 closer to bearings washer 224), thereby increasing pressure on adjustable bearings 218 and 220. In some embodiments, threaded adjustor rod 222 may be adjustable at a proximal end 222b of threaded adjustor rod 222 associated with bearings washer 224, (as illustrated in FIG. 3). For example, this may allow adjusting threaded adjustor rod 222 from below the generator, which may be particularly beneficial when the blades 102a and 102b, or a flanged spindle 250 in FIGS. 1A and 1B obstruct or completely block access to the distal end 222a of the threaded adjustor rod 222.

In some embodiments, a plurality of brackets is interposed between the plurality of blades and the mounting plate. A bracket may include a support or brace functioning as an intermediate component to affix one object to another object. The plurality of blades may be connected to the mounting plate via a plurality of brackets, to secure the blades to the mounting plate (e.g., using a plurality of bolts). In some embodiments, the number of brackets may correspond to the number of blades (e.g., each bracket may support a blade). In some embodiments, the plurality of brackets may be distributed symmetrically around the mounting plate. Alternatively, and as shown in FIG. 1B, a flanged spindle 250 may connect a blade support pole 104 to mounting plate 212, and the blades 102a and 102b may be connected to support pole 104 instead of being directly connected to the mounting plate 212. When brackets are employed, the support pole 104 may be omitted, or may be included for added support.

Figure 4:
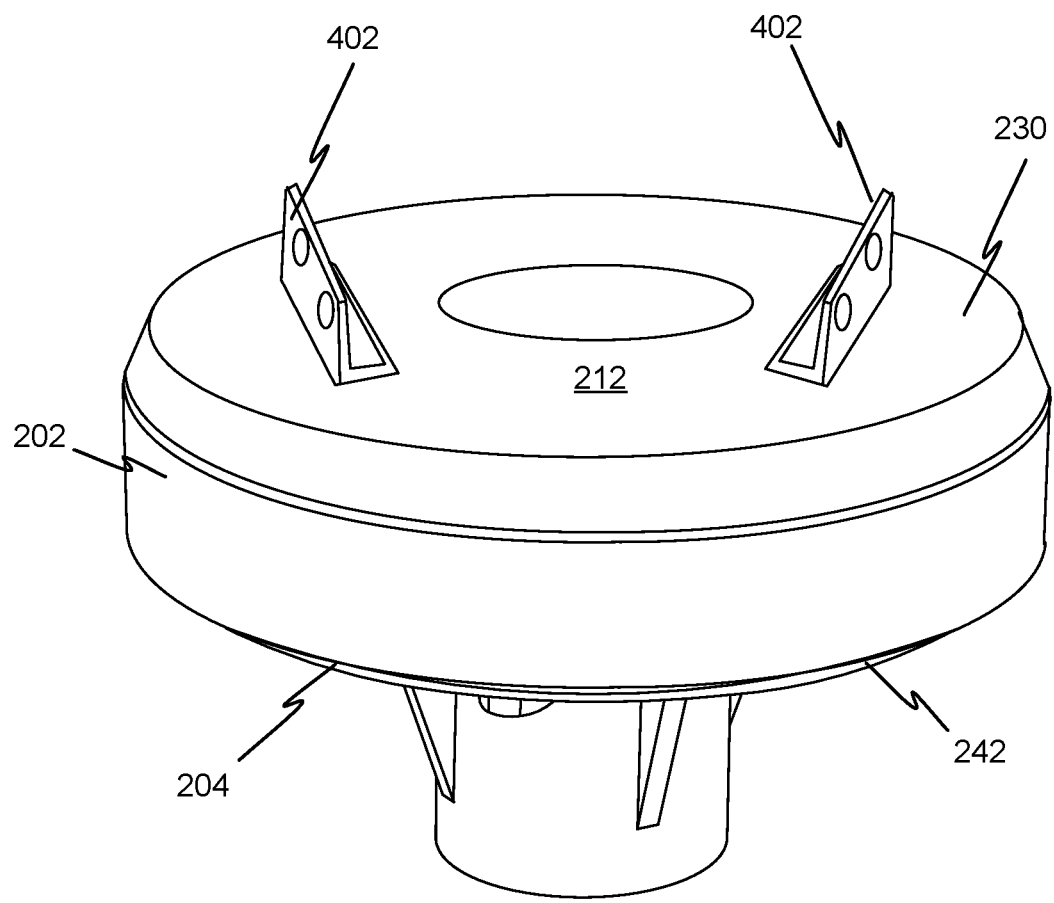
FIG. 4 shows a plurality of brackets for supporting a plurality of blades of a turbine, consistent with some disclosed embodiments.

By way of a non-limiting example, reference is made to FIG. 4 showing a plurality of brackets 402 for supporting the blades of a turbine, consistent with some disclosed embodiments. The turbine may be substantially similar to turbine 100 of FIGS. 1A-1B with the noted difference that plurality of brackets 402 may allow securing the blades of the turbine to mounting plate 212 of shaftless electric generator 200, e.g., using any combination of bolts, screws, welding, soldering, brazing, with adhesive, or other relatively permanent methods of attachment.

As mentioned earlier, some embodiments may involve at least one upstanding blade support pole extending from the mounting plate and to which the plurality of blades are connected. A blade support pole may include a bar or a rod configured to hold or maintain an object. Upstanding may refer to upright, or vertically oriented (upstanding with respect to the mounting plate), depending on the type and use of the turbine. An upstanding blade support pole may refer to a rod configured to support or maintain one or more upstanding blades of a turbine. For example, to prevent the plurality of blades from twisting and/or deforming in response to a moving fluid, a support pole may be affixed to the mounting plate in a vertical upstanding orientation. In the embodiment of FIG. 1A and FIG. 1B, the support pole serves as the mechanism for transferring forces exerted on the blades to the mounting plate. In other words, the plurality of blades may be connected to the pole, such that when a fluid flow causes the plurality of blades to spin, the spinning forces are transferred to the pole. The pole may also serve as a support for the blades to prevent warping or deformation and may facilitate in maintaining the plurality of blades in a substantially upstanding (e.g., upright or vertical) configuration.

Some embodiments may involve a plurality of support arms interconnecting the plurality of blades with the upstanding blade support pole. A support arm may refer to a rigid bar or elongated member configured to stabilize an object or maintain an orientation of an object, e.g., when the object is subject to a deforming force or moment. Interconnect may include joining or linking a plurality of objects, such that the plurality of objects may behave as an integral whole. For example, a series of support arms may extend through the support pole and be connected to opposite sides of the blade (e.g., to opposing horizontal sides of the blade curving outwards from the support arm). In this manner the support arms may interconnect the blade with the pole. Consequently, a moving fluid imposing a force (e.g., a shear force or moment) on a particular blade and capable of deforming or warping the particular blade may encounter resistance from the support arm and support pole. The resistance by the support pole may facilitate in maintaining any particular blade of the plurality of blades in a substantially upstanding (e.g., vertical) orientation.

By way of a non-limiting example, FIGS. 1A-1B show a plurality of support arms 106 interconnecting blades 102a and 102b with upstanding blade support pole 104. Each of arms 106 may extend through support pole 104 and connect to opposing horizontal sides of one of blades 102a and 102b, shown curved or cupped outwards from arms 106. For example, the configuration of support pole 104 and support arms 106 interconnecting blades 102a and 102b may prevent warping or deforming blades 102a and 102b when subject to a moving fluid, and may facilitate maintaining blades 102a and 102b in a substantially upstanding (e.g., vertical) configuration.

In some embodiments a central bore underlies an upper surface of the mounting plate is configured to receive the threaded adjustor rod. In other words, an opening of the bore may be obstructed by the support pole or a flange connected to the support pole. As illustrated in FIG. 1A for example. Support pole 104 and flanged spindle 250 overly the central bore, making it inaccessible after the turbine is assembled.

In some embodiments, a pole may overlie the central bore. For example, an end of the pole (and/or a spindle flange on an end of the pole) may overlap with or cover the opening central bore. The support pole may be configured to be rotatable with the mounting plate as the threaded adjustor rod rotates with the rotor. Since the pole and the adjustor rod are connected to the mounting plate, both rotate with the mounting plate.

The central bore (e.g., beneath the surface of the mounting plate) may grip the threaded adjustor rod in a substantially vertical orientation via the spiral groove coupled to the spiral ridge. Consequently, the support pole with the threaded adjustor rod may include a substantially vertical axis aligned with the central axis of the rotor, where the support pole and the threaded adjustor rod may rotate (e.g., in unison) with the rotor. However, it is to be noted that the support pole and the threaded adjustor rod may be mechanically decoupled in the sense that whereas the support pole may bear the load of the plurality of blades, the threaded adjustor rod may be free (e.g., independent) of the load of the plurality of blades.

By way of a non-limiting example, in FIG. 2E, central bore 234 (e.g., threaded bore 234), for receiving distal end 222a of threaded adjustor rod 222, is illustrated. Central bore 234 may include a helical groove corresponding to a helical ridge on threaded adjustor rod 222. In FIG. 1B, support pole 104 may overly central bore 234 of mounting plate 212.

Some embodiments may involve a housing having an upper portion rotatable relative to a lower portion, and wherein the mounting plate is integral with the upper portion. A housing may include an encasement, shell, or capsule enclosing an object (e.g., an electric generator). An upper portion and a lower portion (e.g., of a housing) may refer to separate components that may be combined to create a housing (e.g., for an electric generator), where one portion may be designated or configured for positioning above the other portion. An upper portion rotatable relative to a lower portion may refer to an upper portion of a housing that may be free to rotate while the lower portion of the housing may be constrained from rotating, such that the upper portion may rotate relative to the lower portion. For example, the upper portion may be connected to a rotor of an electric generator and the lower portion may be connected to the stator. The mounting plate may be Integral with the upper portion in that the mounting plate be part of, affixed to, and/or attached to the upper portion of the housing. A mounting plate integral to an upper portion (e.g., of a housing for an electric generator) may thus include fastening the mounting plate to the upper portion of the housing, e.g., using a combination of one or more screws, bolts, and/or additional connecting components. In some embodiments, the mounting plate may be connected to the upper portion via welding, soldering, brazing, with adhesive, or other relatively permanent methods of attachment. For example, an electric generator may be encased inside a housing, e.g. to meet safety regulations and/or to protect the interior of the electric generator from environmental elements. However, since the electric generator may include one or more moving parts (e.g., a rotor connected to a plurality of blades via the mounting plate) and one or more stationary parts (e.g., a stator), the housing may be designed to accommodate both the moving parts and the stationary parts by including an upper portion to enclose the moving parts and a lower portion to enclose the stationary parts. In some embodiments, other than the adjustable bearings (e.g., which may be a sole location of contact between the upper housing and the lower housing), the upper housing and the lower housing may be separated, e.g., by air space.

By way of a non-limiting example, in FIG. 2A, shaftless electric generator 200 may include a housing 240. Housing 240 may include an upper housing 230 associated with rotor 202 and a lower housing 242 associated with stator 204. Upper housing 230 may be rotatable relative to lower housing 242. Mounting plate 212 may be integral with the upper housing 230. Mounting plate 212 may connect to upper housing 230 via bolts 258.

In some embodiments, the upper portion of the housing includes a flange that overhangs a lower portion of the housing. A flange may include a protruded ridge, collar, or rim, e.g. for increasing the strength of an object. Overhanging may refer to extending outwards and over, e.g., to cover or shelter an object beneath an overhanging object. In some embodiments, a rotor of an electric generator may include one or more magnets, and a stator may include windings (e.g., for inducing electrical energy from the alternating magnetic field produced by the rotor). The rotor may be encased in the upper portion of the housing and the stator may be encased in the lower portion of the housing. The upper housing and lower housing may be mechanically decoupled (e.g., detached) to allow the upper housing and rotor rotate relative to the lower housing and stator. However, the detachment between the upper and lower portions may leave a gap that may expose the windings to environmental elements, causing damage to the electric generator and/or posing a safety hazard. Covering the lower portion of the housing with an overhanging flange of the upper portion of the housing may help to mitigate damage and/or safety hazards. In some embodiments, a protective resin coats the interior of the shaftless electric generator, e.g., to protect against corrosion due to environmental elements.

By way of a non-limiting example, in FIG. 2E, upper housing 230 may include a flange 244 that overhangs lower housing 242, for example, to prevent moisture from entering shaftless electric generator 200.

Some embodiments involve an elevation support for supporting the lower housing. An elevation support may include a platform, a pole, a shaft, or a stand for raising or lifting one or more objects. An elevation support for supporting the lower housing (e.g., which may remain stationary as the upper housing rotates) may raise or lift the electric generator in an elevated position. For example, an elevated position may be advantageous to conserve ground space in an urban environment and/or to distance the rotating blades from people or animals.

In some embodiments, the elevation support includes a channel therein for electrical wiring. A channel may include a tube, a hollow, or a conduit. Electrical wiring may refer to a filament made of conducting material (e.g., copper) for conveying electrical energy from a power source to a power sink. To convey the electrical energy generated by the electric generator to a power sink (e.g., via an electrical grid), the windings (e.g., located in the stator) may connect to electrical wiring which may convey the electrical energy as an AC current to the power sink. The electrical wiring may be enclosed inside the elevation support (e.g., for safety). Elevation support may be distinct and disconnected (e.g., non-rotatable) from the support pole interconnecting the plurality of blades described earlier.

By way of a non-limiting example, in FIGS. 1A-1B, an elevation support 108 may support lower housing. Elevation support 108 may include a channel 110 (e.g., internal to elevation support, as indicated with a dashed line) for electrical wiring (e.g., electrical wiring 248 shown in FIG. 2E). Elevation support 108 may be disconnected from support pole 104 (e.g., elevation support 108 may be stationary while support pole 104 rotates with blades 102a and 102b).

In some embodiments, the adjustable bearings include two rings of bearings and wherein the upper housing rests on one of the rings of bearings. Rest on may refer to supported by or laid on. As noted earlier, the electric generator may include two rings of bearings to facilitate rotation of the rotor relative to the stator. Contact between the rotor and stator may be facilitated (e.g., solely) via the first and second rings of bearings. The upper housing (e.g., rotatable with the rotor and supporting the plurality of blades via the mounting plate) may rest on the first ring of bearings and/or a second ring of bearings. This configuration may allow transferring the load and/or torque produced by the plurality of plates to two rings of adjustable bearings, allowing to distribute the load therebetween.

By way of a non-limiting example, in FIG. 2D, upper housing 230 may rest on ring of bearings 218.

Some embodiments involve a flanged spindle interconnecting the support pole with the mounting plate. A spindle may refer to a rod or spike configured to spin. A flanged spindle may refer to a rod or spike including a ridge or protrusion extending from the rim at a base of the rod, e.g. allowing for connection of one or more objects to the rod and/or to the rimmed base. A flanged spindle may be fastened to the mounting plate (e.g., using a plurality of bolts and/or screws) allowing connection of the support pole with the mounting plate via the rod portion of the flanged spindle while simultaneously connecting the plurality of blades with the mounting plate via the flange portion of the flanged spindle.

By way of a non-limiting example, in FIG. 1B, a flanged spindle 250 may interconnect support pole 104 with mounting plate 212. Similarly, FIG. 2A shows a close up view of flanged spindle 250. Flanged spindle 250 may include a rod portion 252 for connecting to support pole 104 and a flanged portion 254 for connecting to mounting plate 212.

During set up of the turbine, forces can be applied to the blades to simulate forces received during operation. The turbine can be observed for wobble and can also be observed to determine the minimum force required to turn the turbine. If wobble is too great or the minimum force too high, the threaded adjustor rod can be turned to either tighten or loosen the bearings and thereby achieve a desired balance between permitted wobble and desired bearing tension.

Unless otherwise defined, all technical and scientific terms used herein have the same meaning as commonly understood by one of ordinary skill in the art. The materials, methods, and examples provided herein are illustrative only and not intended to be limiting.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof. And other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Moreover, while illustrative embodiments have been described herein, the scope includes any and all embodiments having equivalent elements, modifications, omissions, combinations (e.g., of aspects across various embodiments), adaptations or alterations based on the present disclosure.

The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A turbine for obtaining energy from a flow, comprising:
a shaftless electric generator having a rotor and a stator;
a mounting plate being rotatable with the rotor;
a void along a central axis of the rotor;
a plurality of blades rotationally coupled to the mounting plate;
adjustable bearings interposed between the rotor and the stator, the adjustable bearings being configured to enable rotation of the mounting plate and the plurality of blades; and
a threaded adjustor rod located in the void, wherein the threaded adjustor rod is configured for manipulation to adjust tension on the adjustable bearings, and wherein the threaded adjustor rod is configured to rotate with the rotor.

2. The turbine of claim 1, where the adjustable bearings include two rings of bearings, and wherein the threaded adjustor rod is configured to enable adjustment of pressure between the two rings of bearings.

3. The turbine of claim 2, wherein the two rings of bearings are located in a common cavity.

4. The turbine of claim 1, wherein the adjustable bearings serve as a sole rotational support for the plurality of blades on the stator.

5. The turbine of claim 1, wherein the threaded adjustor rod is part of a screw.

6. The turbine of claim 1, wherein the mounting plate includes an opening therein through which the threaded adjustor rod is configured to extend, and wherein a nut is located on a distal end of the threaded adjustor rod to thereby enable the tension to be increased on the adjustable bearings when the threaded adjustor rod is tightened in the nut.

7. The turbine of claim 1, wherein a threaded bore underlies an upper surface of the mounting plate, the threaded bore for receiving the threaded adjustor rod, to thereby enable the tension to be increased on the adjustable bearings when the threaded adjustor rod is tightened in the threaded bore.

8. The turbine of claim 1, wherein the threaded adjustor rod is adjustable from a side of the adjustable bearings opposite the mounting plate.

9. The turbine of claim 1, wherein the rotor is configured to rotate within the stator.

10. The turbine of claim 1, wherein rotor is configured to rotate about the stator.

11. The turbine of claim 1, wherein a plurality of brackets is interposed between the plurality of blades and the mounting plate.

12. The turbine of claim 1, further comprising at least one upstanding blade support pole extending from the mounting plate and to which the plurality of blades are connected.

13. The turbine of claim 12, further comprising a plurality of support arms interconnecting the plurality of blades with the upstanding blade support pole.

14. The turbine of claim 12, wherein the void underlies an upper surface of the mounting plate, and wherein the pole overlies the void, the pole being configured to be rotatable with the mounting plate as the threaded adjustor rod rotates with the rotor.

15. The turbine of claim 12, further comprising a flanged spindle interconnecting the pole with the mounting plate.

16. The turbine of claim 1, further comprising a housing having an upper portion rotatable relative to a lower portion, and wherein the mounting plate is integral with the upper portion.

17. The turbine of claim 16, wherein the upper portion of the housing includes a flange that overhangs a lower portion of the housing.

18. The turbine of claim 16, further comprising an elevation support for supporting the lower housing.

19. The turbine of claim 18, wherein the elevation support includes a channel therein for electrical wiring.

20. The turbine of claim 16, wherein the adjustable bearings include two rings of bearings and wherein the upper housing rests on one of the rings of bearings.

21. The turbine of claim 1, wherein a protective resin coats the interior of the shaftless electric generator.

22. The turbine of claim 1, wherein the rotor is configured to rotate in response to a wind flow.

* * * * *